United States Patent [19]

Hocking

[11] Patent Number: 4,599,010
[45] Date of Patent: Jul. 8, 1986

[54] ANCHORING DEVICE

[75] Inventor: Warwick P. Hocking, Durban, South Africa

[73] Assignee: Tu-Fit (Proprietary) Limited, Durban, South Africa

[21] Appl. No.: 616,667

[22] Filed: Jun. 4, 1984

[30] Foreign Application Priority Data

Jun. 10, 1983 [ZA] South Africa .................. 83/4271

[51] Int. Cl.⁴ ............................................. F16B 7/08
[52] U.S. Cl. .................................... 403/191; 403/49; 403/246; 411/537
[58] Field of Search ................. 403/49, 246, 191, 385; 411/537, 366, 378

[56] References Cited

U.S. PATENT DOCUMENTS

| 2,194,883 | 3/1940 | Burton | 403/385 |
| 3,266,208 | 8/1966 | Maggs et al. | 403/49 X |
| 4,059,872 | 11/1977 | Delesandri | 403/385 X |

FOREIGN PATENT DOCUMENTS

| 64111 | 3/1974 | Australia | 403/49 |
| 1263236 | 2/1972 | United Kingdom | 403/49 |

Primary Examiner—Andrew V. Kundrat
Attorney, Agent, or Firm—Pennie & Edmonds

[57] ABSTRACT

An anchoring device in the form of a connection (10) has an axial bore (12) formed by two semi-circular elements (14,16) having four sills (26) which form right angle projections. Bores (30) are formed in the sills (26) for receiving bolts (36) having transverse pins (34) in a pivotal relationship. The sills (26) have inclined surfaces (38) which in use form a seat for the nut of the bolt (36) and to orientate the bolt at an angle in the passage (30).

9 Claims, 9 Drawing Figures

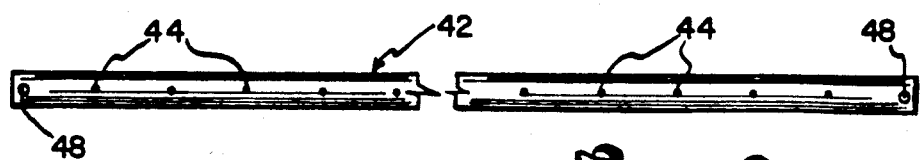
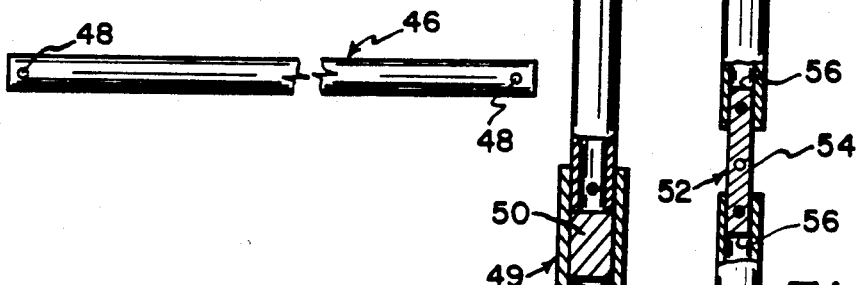
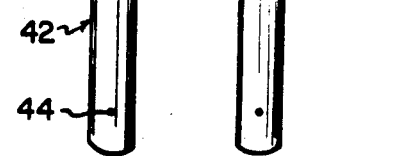
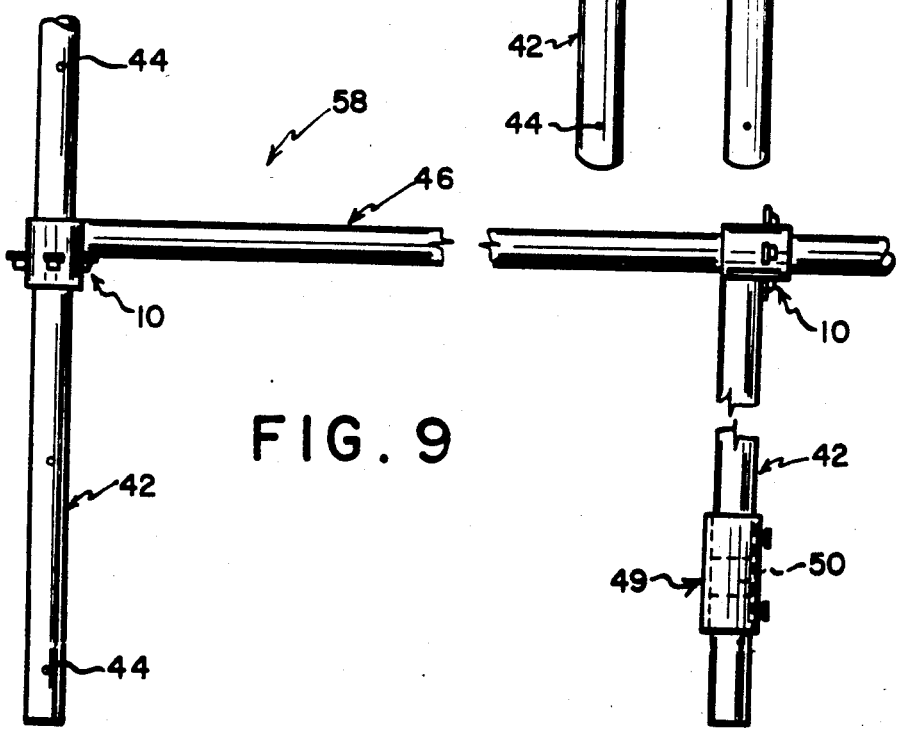

ANCHORING DEVICE

This invention relates to an anchoring device and in particular to a device which may be anchored to the face of an element without the need for access to the reverse side of the element.

It is an object of the invention to provide an anchoring device which may be mounted to the face of an object without access to the reverse side of such object.

According to the invention an anchoring device includes a body having a passage adapted to receive a bolt element in pivotal relationship, the body presenting an inclined surface to a nut element and the end of the bolt remote from the nut being adapted to engage a formation.

In a preferred form of the invention the passage includes a countersunk recess in which a transverse element mounted on the bolt may be housed for forming the pivotal axis for the bolt.

Preferably the inclined surface comprise a planar surface which is sloped to one side. The inclined surface preferably forms the seat for the nut element so that when the nut is tightened the shank of the bolt is disposed at substantially right angles to the inclined surface. In this position the bolt is angularly disposed in the passage of the anchoring device and in the bore of a passage formed in a structure to which the anchoring device may be fixed.

Preferably the end of the bolt remote from the nut comprises an elongate shank which is adapted for location in a bore. The face of the anchoring device adapted to abut the structure may include engaging formations. Preferably more than a single bolt is provided and the axis of orientation when the nut is tightened is in an opposed direction for engaging the walls of a bore in a structure to which the device may be anchored.

According to one aspect of the invention an anchoring device includes a body having a substantially cylindrical passage formed therein by at least two elements having fastening means for connecting the elements to each other and to a constructional element, the device including at least one member forming a support face at an angle to a surface of the device, the support face being adapted to be abutted by an end of a transverse element, and the member having a passage for receiving a bolt element in pivotal relationship and an inclined surface for seating a nut element.

Preferably the member forming the support face is at substantially right angles to the face of the anchoring device to constitute a right angle support face.

In a preferred form of the invention the anchoring device comprises two halves of an elongate tube which are hingedly connected to each other along a surface. The opposite ends preferably include a collar and bore arrangement for receiving a fastener in the form of a bolt and nut. The collar is preferably profiled to receive the head of a bolt while the shank of the bolt passes through the bore.

The support member is preferably connected to the anchoring device at right angles and comprise preferably four in number and preferably equally spaced around an outer periphery of the connector. The upper surface of the support member and a side surface of the device form a right angle for receiving a transverse element. Preferably the upper surface of the connector is curved in profile for mating with a like curved surface of a transverse element.

The cylindrical passage in the connector preferably includes a dowel, pin or a bore for receiving a screw or the like adapted for location in a bore formed in the constructional element.

Preferably the constructional element to which the anchoring device is adapted to be fastened comprises verticals and horizontals of a scaffolding system. The constructional elements comprise lengths of tubes having holes drilled in a straight line along the length and at predetermined distances apart.

Preferably modular connectors are provided for the constructional elements. In one form of the modular connector comprises a sleeve having ends adapted for receiving ends of constructional elements. A central region of the sleeve may preferably include a spacer. In another form the modular connector comprises a spigot having a central spacer.

An embodiment of the invention is described by way of example with reference to the accompanying drawings in which:

FIGS. 5 and 6 are side view of horizontals or verticals for scaffolds;

FIGS. 7 and 8 are side views of joining elements; and

FIG. 9 is a part of a scaffold using connectors of the invention.

Figure 1:
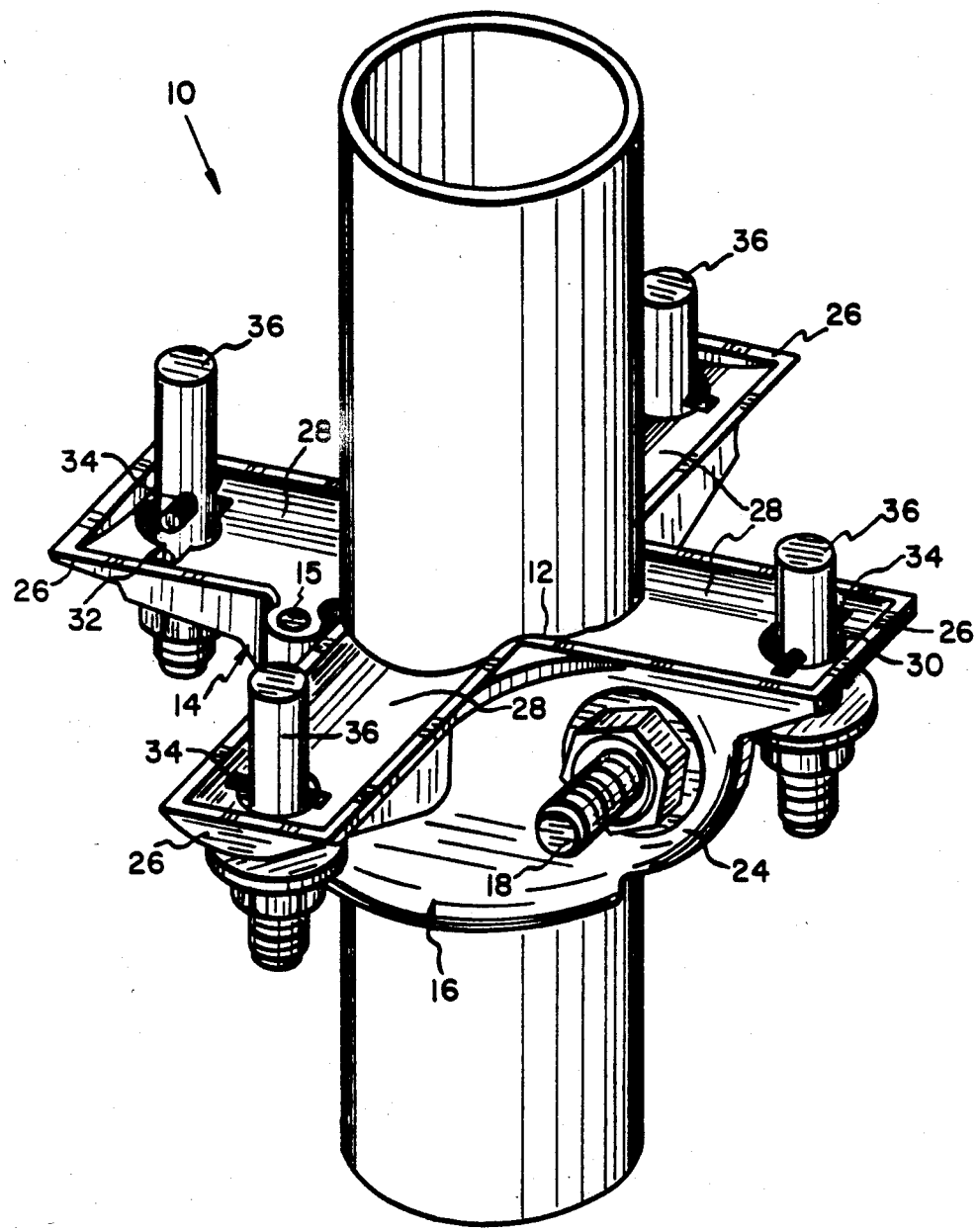
FIG. 1 is a perspective view of connector incorporating the anchoring device of the invention and fixed to a tube.
Figure 2:
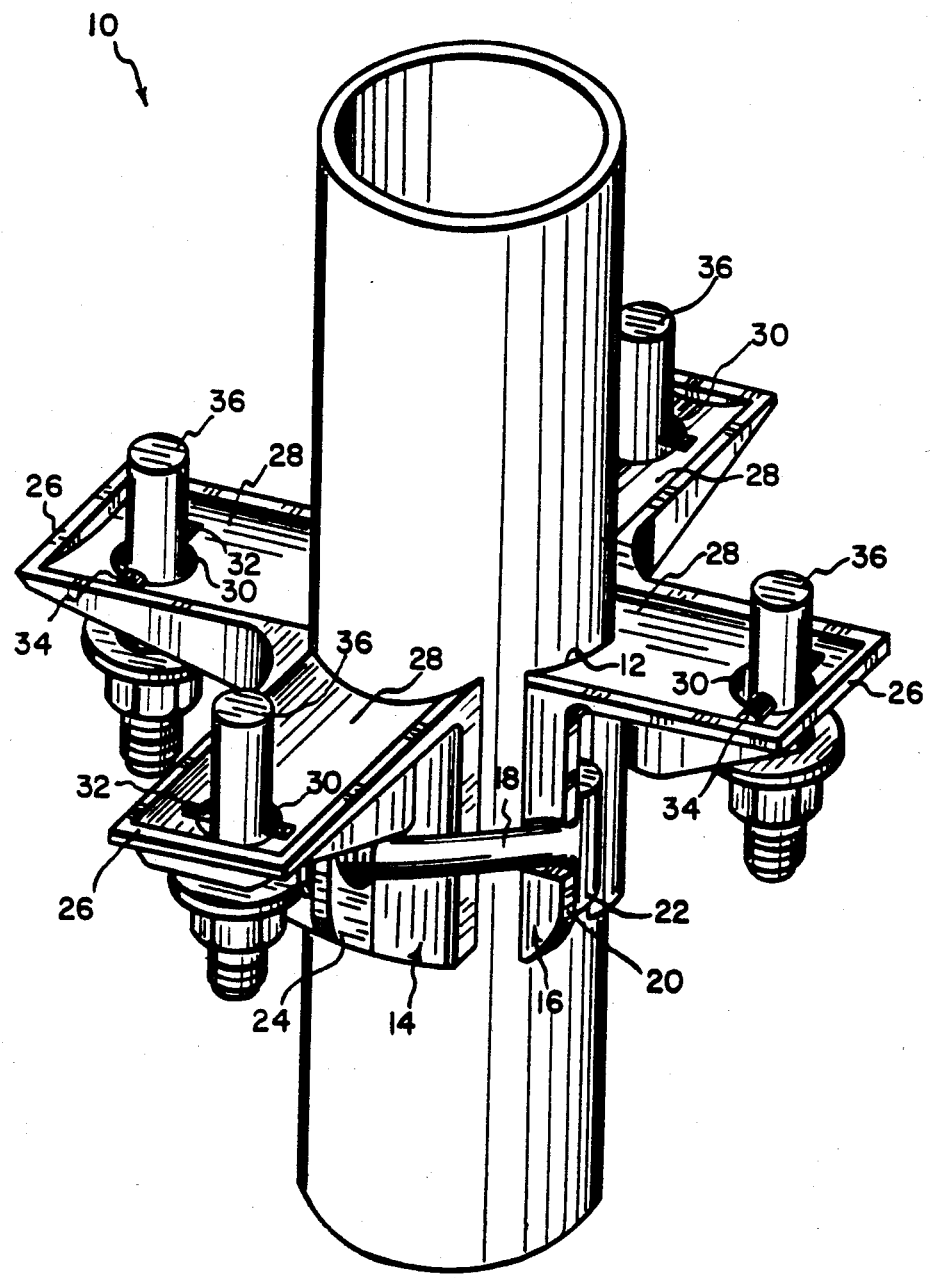
FIG. 2 is a further perspective view of the connector of FIG. 1.
Figure 3:
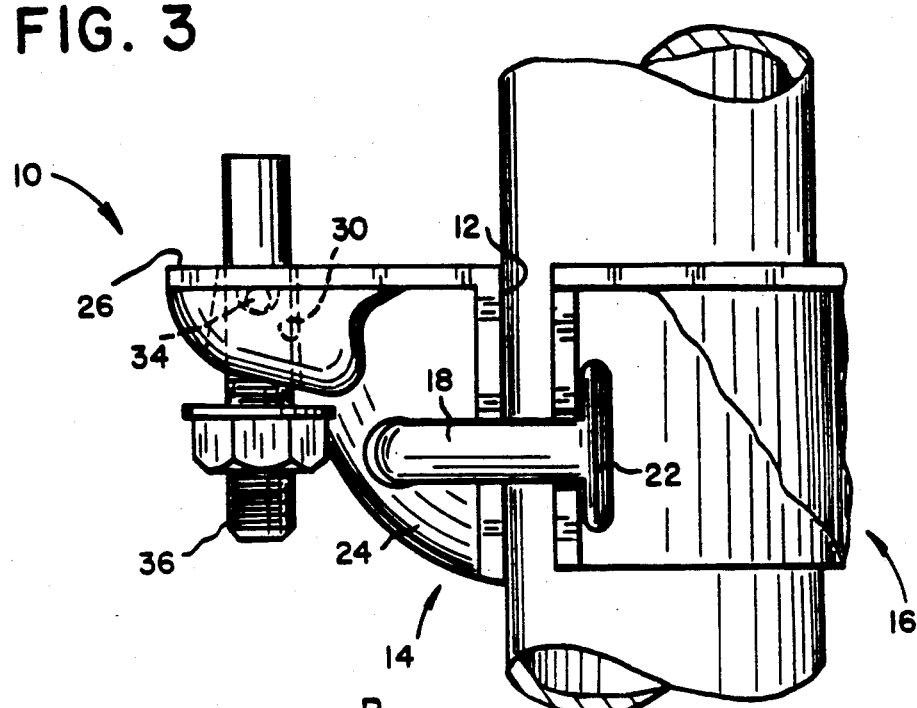
FIG. 3 is a side view of the connector of FIG. 1.
Figure 4:
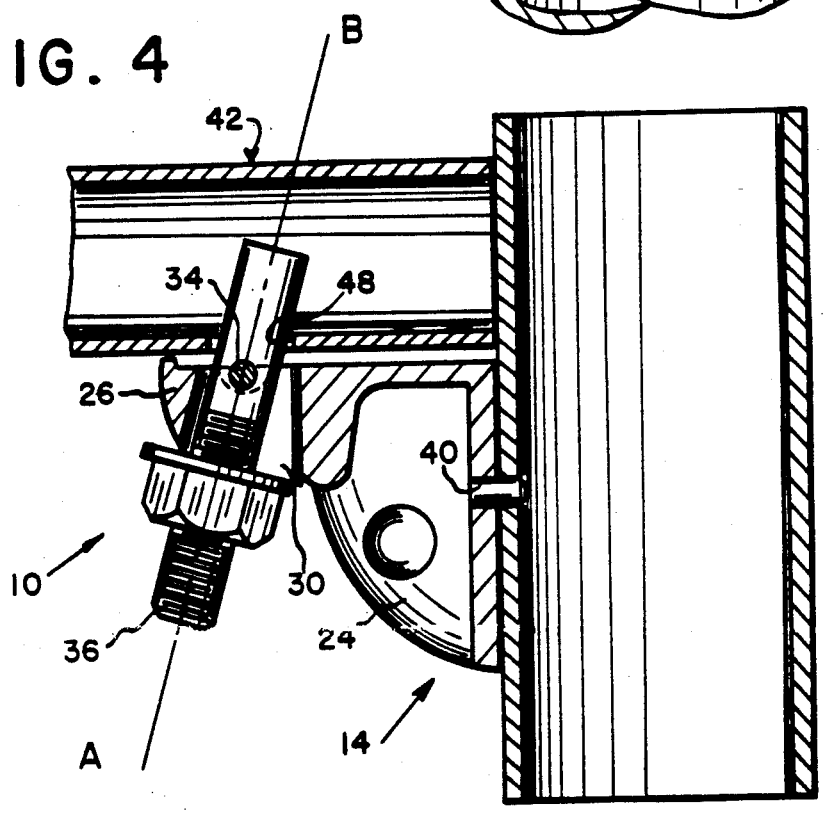
FIG. 4 is a fragmentary section taken of a connector of FIG. 1 joined to a horizontal.

Referring to the drawings a connector 10 incorporating the anchoring device of the invention comprises a substantially cylindrical body having a circular axial bore 12 extending through its length. The connector 10 is made up of two semi-cylindrical elements 14,16 which are connected to each other by a hinge pin 15 at a longitudinal surface while the opposite ends are connected by a bolt 18. The element 16 has two spaced apart lugs 20 for mating with a shoulder 22 of the bolt 18 while the element 14 has a plate 24 having a bore for receiving the shank of the bolt 18. In use the nut of the bolt 18 is unscrewed and the shoulder 22 slid over the lugs 20 before screwing the nut to firmly anchor the connector 10 on a horizontal or vertical.

The connector 10 has four sills 26 which form right angle projections from the connector 10 and are concave at 28 for supporting the horizontals. The sills 26 each have a bore 30 provided with a seating formation 32 in the form of a countersunk recess for receiving a lug 34 of a bolt 36. The undersurface of the sills 26 has an angularly profiled surface 38 which biases the axis of the bolt 26 in the direction of the line A–B. When the nut of the bolt 36 is fastened to contact the surface 38. The connector 10 has a bore 40 for receiving a screw or the like for locating the connector on a vertical or horizontal.

A vertical 42 has a plurality of holes 44 formed in a straight line on the tube and spaced apart at about 250 mm. The horizontal 46 has terminal holes which are also provided on the vertical 42. The horizontal 46 may optionally have holes 44 which would then render it indistinguishable from the verticals 42.

The sleeve 49 has a spacer block 50 located centrally in its bore. The ends of the sleeve 49 are formed for receiving in frictional engagement ends of horizontals or verticals. A spigot 52 has a spacer 54 the ends 56 of which fit the internal bores of the horizontals or verticals.

A part of a constructed scaffold 58 shown in FIG. 9 illustrates use of the invention. The connectors 10 are versatile enabling verticals or horizontals to be supported in a plurality of different orientations. The sleeves 49 and spigots 52 enable joining of the horizontals or verticals as well as correcting for the lengths of these members during use. The dowel 40 enables easy location of the connection 10 on a vertical or horizontal by seating in any of the holes 44. The terminal holes 48 receive the bolt 36 for fastening the horizontals or verticals to the connectors 10.

An advantage of the invention is that the anchoring device may be used for a multiplicity of purposes. The scaffold elements incorporating the anchoring device are completely modular enabling ease and simplicity of manufacture or use.

I claim:

1. An anchoring device including a body having a substantially cylindrical passage formed therein by at least two elements having fastening means for connecting the elements to each other and to a constructional element, the device including at least one member forming a support face at an angle to a surface of the body, the support face being adapted to be abutted by a side of the transverse element and the member having a passage for receiving a bolt element in pivotal relationship and an inclined surface for seating a nut element.

2. An anchoring device according to claim 1 in which the end of the bolt element remote from the nut element is adapted to engage a bore formed in the transverse element which forms an element of a scaffolding system.

3. An anchoring device according to claim 2 in which the support face is at substantially right angles to the face of the anchoring device and the inclined surface is formed on the surface opposed to the support face.

4. An anchoring device according to claim 3 which comprises a body having two halves which are hingedly connected to each other and include means for receiving a bolt for fastening the body halves to each other and four support members for receiving the transverse element.

5. An anchoring device including a body having a passage, a bolt element having a transverse pin fixed between the ends of the bolt element and pivotally located in the passage for pivoting on said pin, and the body presenting an inclined surface to a nut element which rides on a first screw threaded zone of the bolt element and a second zone of the bolt remote from the first zone being engageable with a formation on a member to hold the member captive against the body of the anchoring device when said bolt element is pivoted.

6. An anchoring device according to claim 5 which includes two spaced apart tapering passages each having a bolt hinged in a recess which forms a seat for the transverse pin of the bolt element.

7. An anchoring device according to claim 6 in which the body has a central passage and the inclined surfaces are located on opposite sides of the passage.

8. An anchoring device according to claim 7 in which the apex of the inclined surfaces is located towards the central passage in the body.

9. An anchoring device according to claim 5 in which the body has an elongate concave surface against which a constructional member may be anchored.

* * * * *